US006256771B1

(12) United States Patent
O'Neil et al.

(10) Patent No.: US 6,256,771 B1
(45) Date of Patent: Jul. 3, 2001

(54) METHOD AND APPARATUS FOR PROVIDING A DYNAMIC SERVICE COMPOSITION SOFTWARE ARCHITECTURE

(75) Inventors: Joseph Thomas O'Neil, Staten Island, NY (US); Sandeep Sibal, Matawan, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 08/951,581

(22) Filed: Oct. 16, 1997

(51) Int. Cl.[7] .................................................. G06F 9/45
(52) U.S. Cl. .............................. 717/1; 709/202; 709/317
(58) Field of Search ................................. 395/701, 709; 717/1; 709/202, 317

(56) References Cited

U.S. PATENT DOCUMENTS

| | | | |
|---|---|---|---|
| 4,799,156 | * | 1/1989 | Shavit et al. ............................ 705/26 |
| 5,390,281 | * | 2/1995 | Luciw et al. ............................ 706/11 |
| 5,434,777 | * | 7/1995 | Luciw ...................................... 717/1 |
| 5,477,447 | * | 12/1995 | Luciw et al. ............................. 704/9 |
| 5,499,364 | * | 3/1996 | Klein et al. ........................... 709/202 |
| 5,522,073 | * | 5/1996 | Courant et al. ........................... 717/1 |
| 5,603,031 | * | 2/1997 | White et al. ......................... 709/317 |
| 5,619,615 | * | 4/1997 | Pitchaikani et al. ................... 706/10 |
| 5,638,494 | * | 6/1997 | Pinard et al. ........................ 709/202 |
| 5,740,368 | * | 4/1998 | Villalpando ......................... 709/202 |
| 5,745,754 | * | 4/1998 | Lagarde et al. ...................... 707/104 |
| 5,761,663 | * | 6/1998 | Lagarde et al. ....................... 707/10 |
| 5,765,142 | * | 6/1998 | Allred et al. ........................... 717/1 |
| 5,790,789 | * | 8/1998 | Suarez ................................... 717/1 |
| 5,850,517 | * | 12/1998 | Verkler et al. ....................... 709/202 |
| 5,887,171 | * | 3/1999 | Tada et al. ........................... 709/317 |
| 5,905,983 | * | 5/1999 | Inomata et al. .......................... 707/4 |
| 5,958,016 | * | 9/1999 | Chang et al. ........................ 709/229 |
| 5,983,200 | * | 11/1999 | Slotznick .............................. 705/26 |
| 6,009,456 | * | 12/1999 | Frew et al. .......................... 709/202 |
| 6,055,562 | * | 4/2000 | Devarakonda et al. ............. 709/202 |

OTHER PUBLICATIONS

Virdbagriswaran et al.; "Standardizing Agent Technology". ACM Digital Library[online]. vol. 3, No. 3 pp. 96–101, Sep. 1995.*

Domel et al.; "Mobile Telescript Agents and the Web". IEEE/IEE Electronic Library[online]. 'Technologies for the Information Superhighway' Digest of Compcon 1996, Feb. 1996.*

Wong et al.; "Concordia: An Infrastructure for Collaborating Mobile Agents". First International Workshop on Mobile Agents 97. [online] Accessed on Sep. 28, 1999, Apr. 1997.*

Sommers, B.; "Agents: Not just for Bond anymore". Javaworld [online]. Accessed on Sep. 27, 1999. Retrieved from the Internet: http://www.javaworld.com, Apr. 1997.*

Venners, B.; "Under the Hood: Solve real problems with aglets, a type of mobile agent". Javaworld [online]. Accessed on Sep. 21, 1999. Retrieved from the Internet: http://www.javaworld.com, May 1997.*

(List continued on next page.)

Primary Examiner—Mark Powell
Assistant Examiner—Kelvin Booker
(74) Attorney, Agent, or Firm—Kenyon & Kenyon

(57) ABSTRACT

A method and apparatus for providing a dynamic service composition software architecture. A user requests a software based service through an agent software component, or "netlet," which dynamically selects an appropriate service netlet. The service netlet then dynamically selects a plurality of component netlets, each of which can receive an event causing the component to perform a function or generate an event as a result of performing a function. The agent, service and component netlets can all be selected from a netlet repository in a network. The service netlet dynamically configures the selected component netlets by determining which components will send or receive events from which other components. As a result, the software based service is dynamically composed.

39 Claims, 7 Drawing Sheets

OTHER PUBLICATIONS

Kotz et al..; "Agent TCL: Targeting the needs of mobile computers". IEEE/IEE Electronic Library[online]. IEEE Internet Computing, vol. 1, Iss. 4, pp. 58–67, Jul. 1997.*

Kiniry et al.; "A hands–on look at Java mobile agents". IEEE/IEE Electronic Library [online]. IEEE Internet Computing, vol. 1, Iss. 4, pp. 21–30, Jul. 1997.*

Hagimont et al; "A protection scheme for mobile agents on Java". ACM Digital Library [online]. Proceedings of the third annual ACM/IEEE conference on mobile computing and networking, Sep. 1997.*

Sundaresan et al.; "Java paradigms for mobile agent facilities". ACM Digital Library [online]. Conference on Object-oriented programming, systems, languages, and applications, Sep. 1995.*

O'Shea et al.; "The revolution continues". Telephony, vol. 232, No. 16, pp. 42–48, Apr. 1997.*

* cited by examiner

METHOD AND APPARATUS FOR PROVIDING A DYNAMIC SERVICE COMPOSITION SOFTWARE ARCHITECTURE

FIELD OF THE INVENTION

The invention relates to the composition of software based services. More particularly, the invention relates to a method and apparatus for providing a dynamic service composition software architecture.

BACKGROUND OF THE INVENTION

Traditional software architecture uses static service composition to create a software based service 10, as shown in FIG. 1A. A number of applications 20 are selected at the time the service 10 is designed. An application is a program designed to perform a specific function and, if required, communicate or interact with other applications. The interactions 30 between the applications 20 are also selected at the time the service 10 is composed. The applications 20 and interactions 30 are selected by a service software designer to achieve the functionality of the desired service 10.

For example, to construct a stock quote service, a service software designer could select three applications A1–A3. The first application (A1) might receive a stock quote feed from a source such as the Internet. The second application (A2) might review the stock quote feed looking for a specific stock at a particular price and the third application (A3) might send an E-mail message to a user when the stock reached that price. The application A1 would interact with the application A2 by periodically sending stock quotes. The application A2 would interact with the application A3 by announcing when the stock has reached the desired price.

There are several problems, however, with using static service composition to create a software based service. Because the selected applications 20 and interactions 30 are fixed at the time the service 10 is designed, they cannot be changed dynamically when the service 10 is executed. As used herein, the words "dynamic" and "dynamically" refer to events occurring at the general time a software service is executed or run, as opposed to a "static" composition which is fixed at the time a software service is created. The resulting software based service is typically built as a monolithic application that is difficult to enhance or modify. This makes changing the functionality of a software based service a very time consuming and expensive task. If a user wanted the stock quote service to send a message to a pager, instead of sending an E-mail message, the major parts of the service would have to be recomposed, retested and reinstalled. With complicated software based services, this process can take well over a year to complete and requires the efforts of specially trained software designers and programmers.

Also, because traditional software architecture dictates that applications 20 and interactions 30 cannot be changed dynamically, only a very limited flexibility can be offered to a user. There is no way, for example, that a user can reconfigure the service 10 to perform an entirely new function, such as creating a graph of a stock price over the past month. Similarly, a user cannot take advantage of an upgraded version of an application without recomposing the entire service 10.

Moreover, because services are created and customized by service software designers, the interactions 30 among the applications 20 are not standardized, nor is the mechanism used to select and to configure the applications 20. The "state" of each application, or set of variables that define the information in the application, is also saved and restored in an ad-hoc manner. These factors contribute to making static service composition a slow, expensive and error-prone operation.

Finally, because the service 10 is composed at design time, and not at run time, it is difficult to take full advantage of the benefits of a distributed network. One advantage of a distributed network is that components can execute on different computers to balance software loads in the network. A static service software designer has no way of knowing, for example, if the applications A1, A2 and A3 can be more efficiently run on different computers. This ultimately results in higher operating expenses because it is necessary to statically assign software to particular machines.

In view of the foregoing, it can be appreciated that a substantial need exists for a method and apparatus for providing a dynamic service composition software architecture that lets a software based service be easily modified.

SUMMARY OF THE INVENTION

The disadvantages of the art are alleviated to a great extent by the method and apparatus for providing a dynamic service composition software architecture. First, a plurality of software components are selected at about the time the service will be executed. Each software component is capable of receiving an event causing the component to perform a function, or generating an event as a result of performing a function. The selected components are then configured, also at about the time the service will be executed, by determining which of the selected components will send or receive events from which other of the selected components. As a result, the software based service is dynamically composed.

With these and other advantages and features of the invention that will become hereinafter apparent, the nature of the invention may be more clearly understood by reference to the following detailed description of the invention, the appended claims and to the several drawings attached herein.

DETAILED DESCRIPTION

Figure 1A:
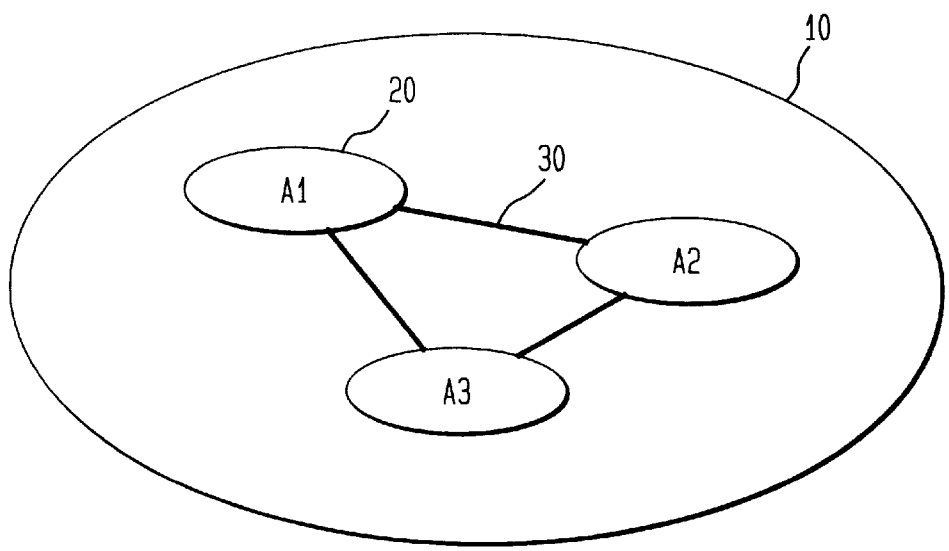
FIGS. 1A and 1B are block diagrams respectively representing the static composition of a software based service and the dynamic composition of a software based service according to an embodiment of the present invention.
Figure 1B:
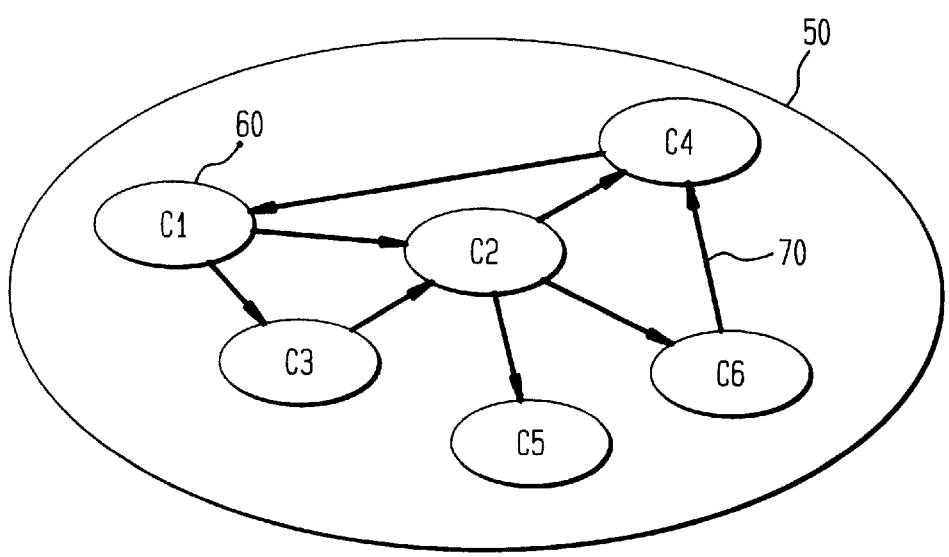

The present invention is directed to a method and apparatus for providing a dynamic service composition software architecture. Referring now in detail to the drawings wherein like parts are designated by like reference numerals throughout, there is illustrated in FIG. 1B the dynamic composition of a software based service 50 according to an embodiment of the present invention. A number of component programs 60 are dynamically selected at the time the service 50 is executed. The component programs 60, also referred to herein as "netlets," are programs designed to perform a specific function. As described with respect to FIGS. 2 through 10, the netlets 60 can enhance the capability of a network much as applets enhance the capability of a browser and servlets enhance the capability of a server.

The netlets 60 communicate by receiving an "event" 70 causing the component to perform a function or generating an event 70 as a result of performing a function. The events 70 generated by one netlet 60 are sent to other netlets in the service 50. The events 70 between netlets 60 are also dynamically configured at the time the service 50 is executed. The netlets 60 and events 70 are selected and configured to achieve the functionality of the desired service 50.

Because netlets are selected and configured at run time, they can be conveniently written by, and purchased from, different sources. A single netlet can be designed to be used and reused in different software based services. Unlike the case with static service composition, this requires the saving and restoring of netlet states in a consistent manner and a standard mechanism must be used for communication between netlets. Moreover, the dynamic nature of the service composition in this architecture lets netlets move from node to node during execution.

In view of the above, a computer language should have several characteristics related to the dynamic service composition software architecture disclosed herein. In particular, the language should provide "introspection" which lets a tool examine a software component, such as a netlet, at runtime and determine the properties, events and functions of that component. Additionally, the language should provide "dynamic software loading" which is the ability to transfer the behavior of an object from an application or software component running on one machine to an application or software component running another. The language should also provide "serialization" which lets the state of a software component running on one machine be transferred to a software component running on another machine. The Java computer language developed by Sun Microsystems is one software technology that can be used to achieve dynamic service composition. Java provides introspection, dynamic software loading and serialization and is designed so that a software component written in Java executes on a Java Virtual Machine (JVM), which in turn runs on the host platform's native Operating System (OS). It should be noted that a fairly large, and growing, number of software components written in Java are already available.

Figure 2:
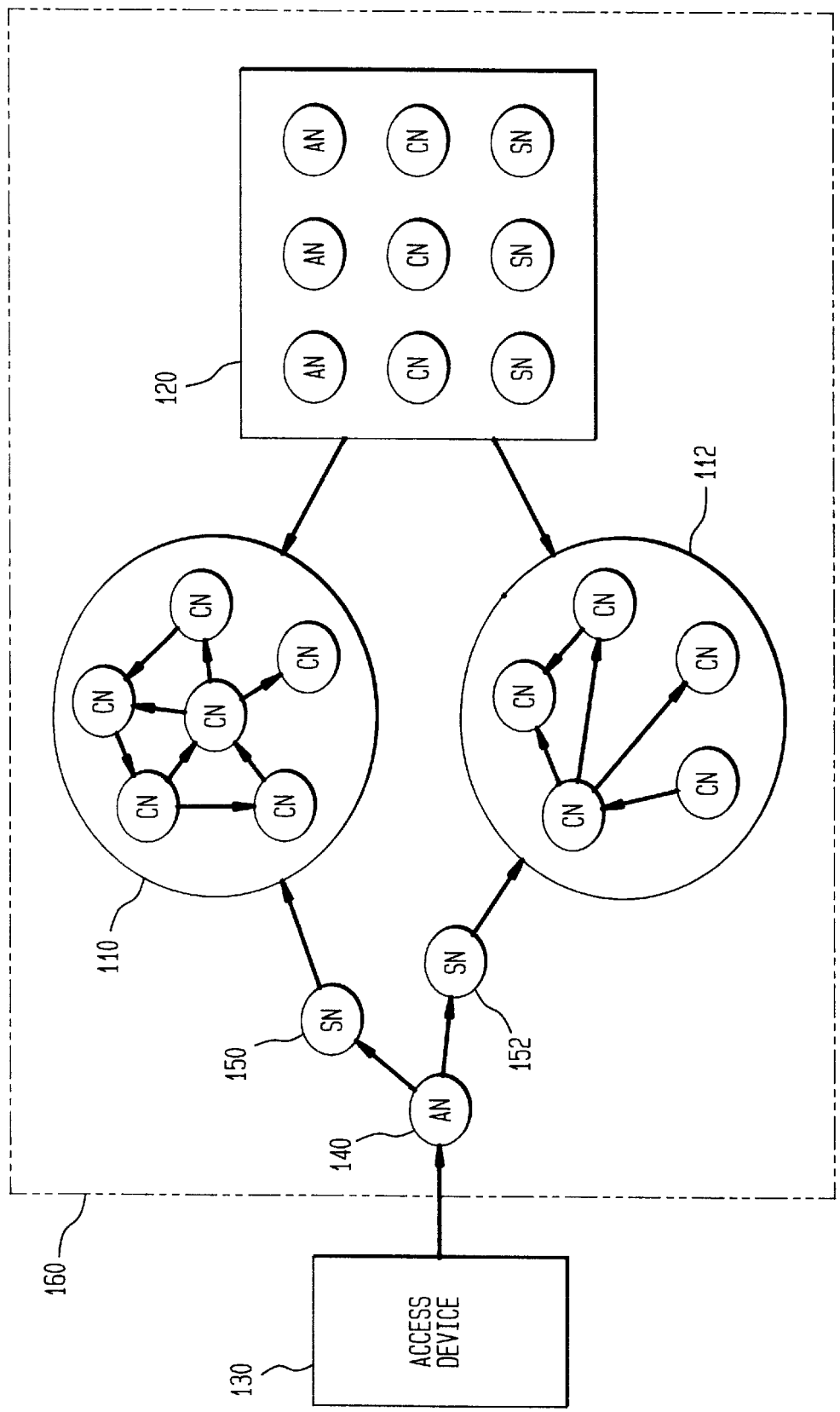
FIG. 2 is a block diagram of an embodiment of the present invention.

Refer now to FIG. 2, showing a block diagram of an embodiment of the present invention. A network 160 contains two dynamically composed software based services 110, 112 similar to the service 50 described with respect to FIG. 1B. The services 110, 112 can be dynamically created at run time by "service netlets" 150, 152. A service netlet is a netlet specifically designed to dynamically integrate a set of component netlets and their associated events into a software based service. To perform this function, the service netlets 150, 152 can take advantage of Java's introspection, dynamic software loading and serialization capabilities described above. Instead of being created by service netlets 150, 152, the component netlets can be manually selected and configured by a user to dynamically compose the software based services 110, 112.

Also shown in FIG. 2 is an agent netlet 140. The agent netlet 140 receives a user request from an access device 130 as described in detail with respect to FIG. 6. The agent netlet 140, the service netlets 150, 152 and the component netlets in the two services 110, 112 can be selected from a netlet repository 120 in the network 160. If, for example, a user asks for two stock quote services, the request is sent from an access device 130 to the agent netlet 140. The agent netlet 140 dynamically selects the two service netlets 150, 152 appropriate for those tasks. Finally, the service netlets 150, 152 dynamically construct the services 110, 112 to achieve the desired functionality of the two stock quote services.

Figure 3:
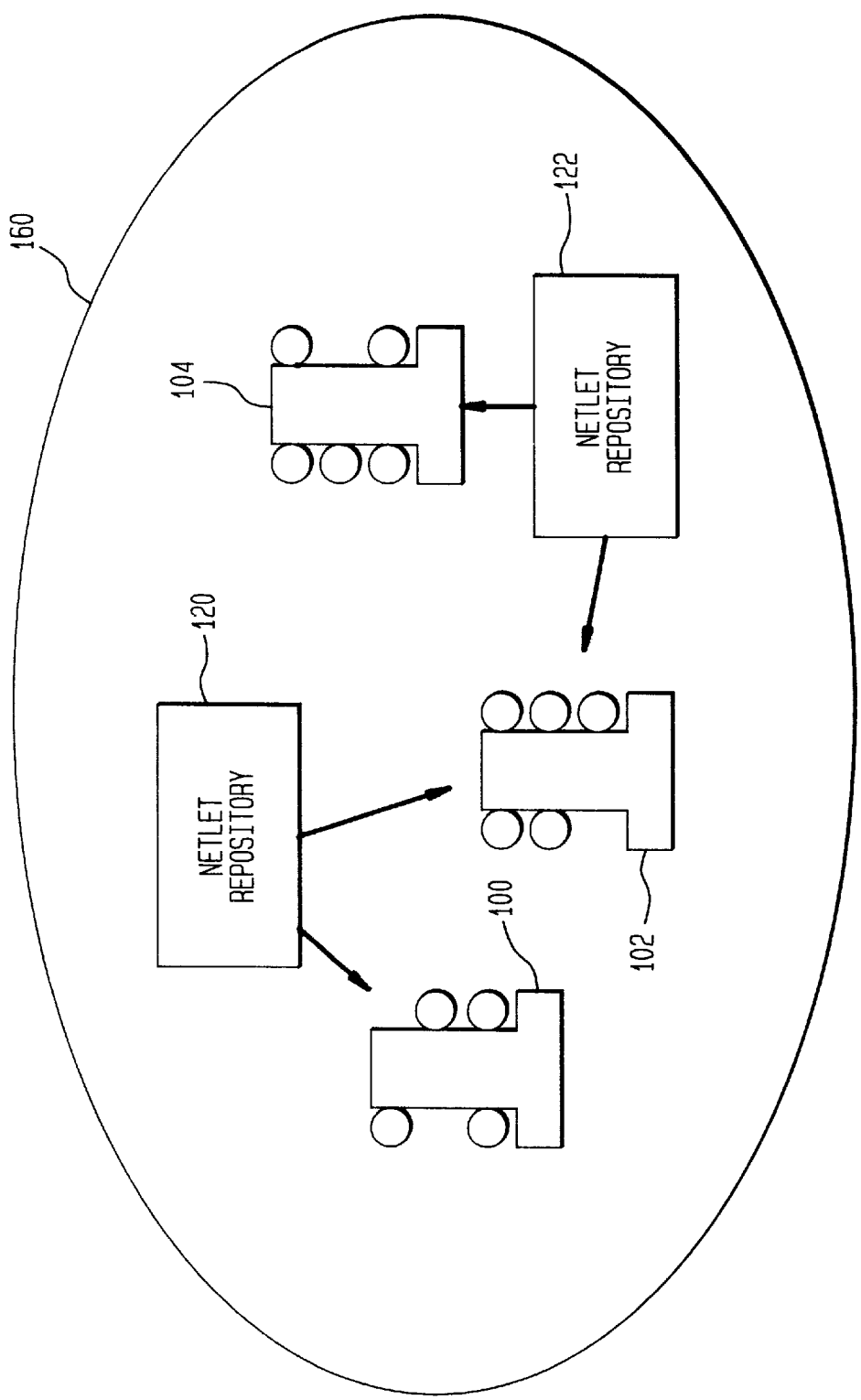
FIG. 3 is a block diagram of a network, including software component repositories, according to an embodiment of the present invention.

FIG. 3 is a block diagram of the network 160 including two separate netlet repositories 120, 122 according to an embodiment of the present invention. Netlets are retrieved from the netlet repositories 120, 122 and executed on netlet hosts 100, 102, 104 which provide an execution environment for the netlets. Netlet hosts in FIGS. 3 to 10 are shown using an inverted T symbol, and netlets executing on a host are shown as circles attached to the inverted T symbol. The netlets executing on the netlet hosts 100, 102, 104 can be agent, service or component netlets. For consistency, agent and service netlets will be shown attached to the left and component netlets will be shown attached to the right of the inverted T symbol.

Figure 4:
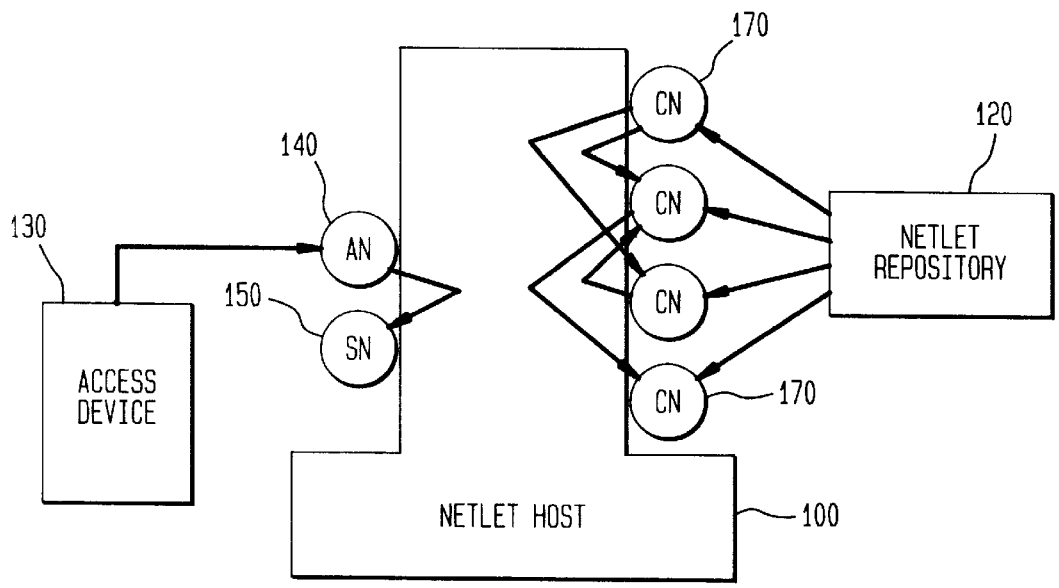
FIG. 4 is a block diagram of a host executing agent, service and selected software components according to an embodiment of the present invention.

FIG. 4 is a block diagram of a single netlet host 100 executing an agent netlet 140, service netlet 150 and several component netlets 170 according to an embodiment of the present invention. When a user makes a request through the access device 130 for a software based service, an agent netlet 140 will dynamically retrieve a service netlet 150 from a netlet repository 120. The service netlet 150 then dynamically retrieves the appropriate component netlets 170 from the netlet repository 120. The service netlet 150 also dynamically configures the component netlets 170 and maps the associated events to achieve the functionality of the requested software based service. The newly composed software service can then begin execution.

Figure 5:
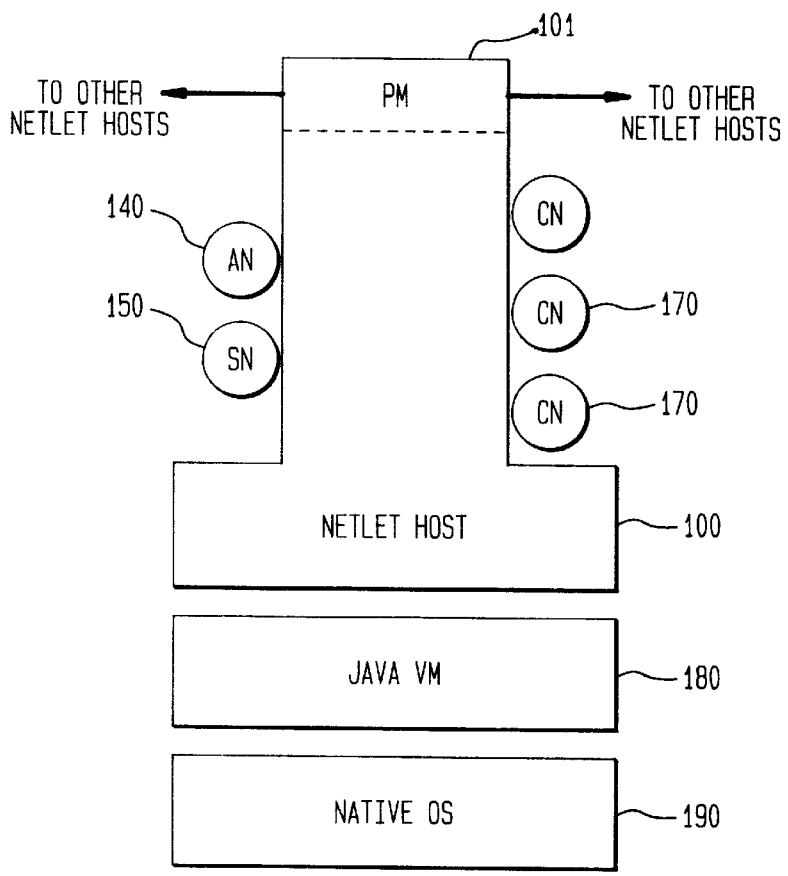
FIG. 5 is a block diagram of a host operating in a network according embodiment of the present invention.

FIG. 5 is a block diagram of a netlet host 100 operating in a network according to an embodiment of the present invention. To execute the Java agent netlet 140, service netlet 150 and component netlets 170, the netlet host 100 is a Java application that executes on a Java Virtual Machine (JVM) 180. The JVM will, of course, run on the platform's native Operating System (OS) 190. A performance monitor 101 is part of the netlet host 100 and communicates with other netlet hosts in the network (not shown in FIG. 5) to accomplish the function of the software based service. This lets the agent netlet 140, service netlet 150 and the various component netlets 170 in a single service run on different netlet hosts in the network. By communicating through the performance monitor 101, a netlet host 100 can create a distributed system and balance the processing load among the machines. The performance monitor 101 also lets a user obtain information about all of the activities that he or she initiated in the network. For example, the agent netlet 140 could, by using the performance monitor 101, communicate with other hosts in the network and inform a user which netlet hosts are executing which services, or which components of which services, and the state of execution for each service or component.

Figure 6:
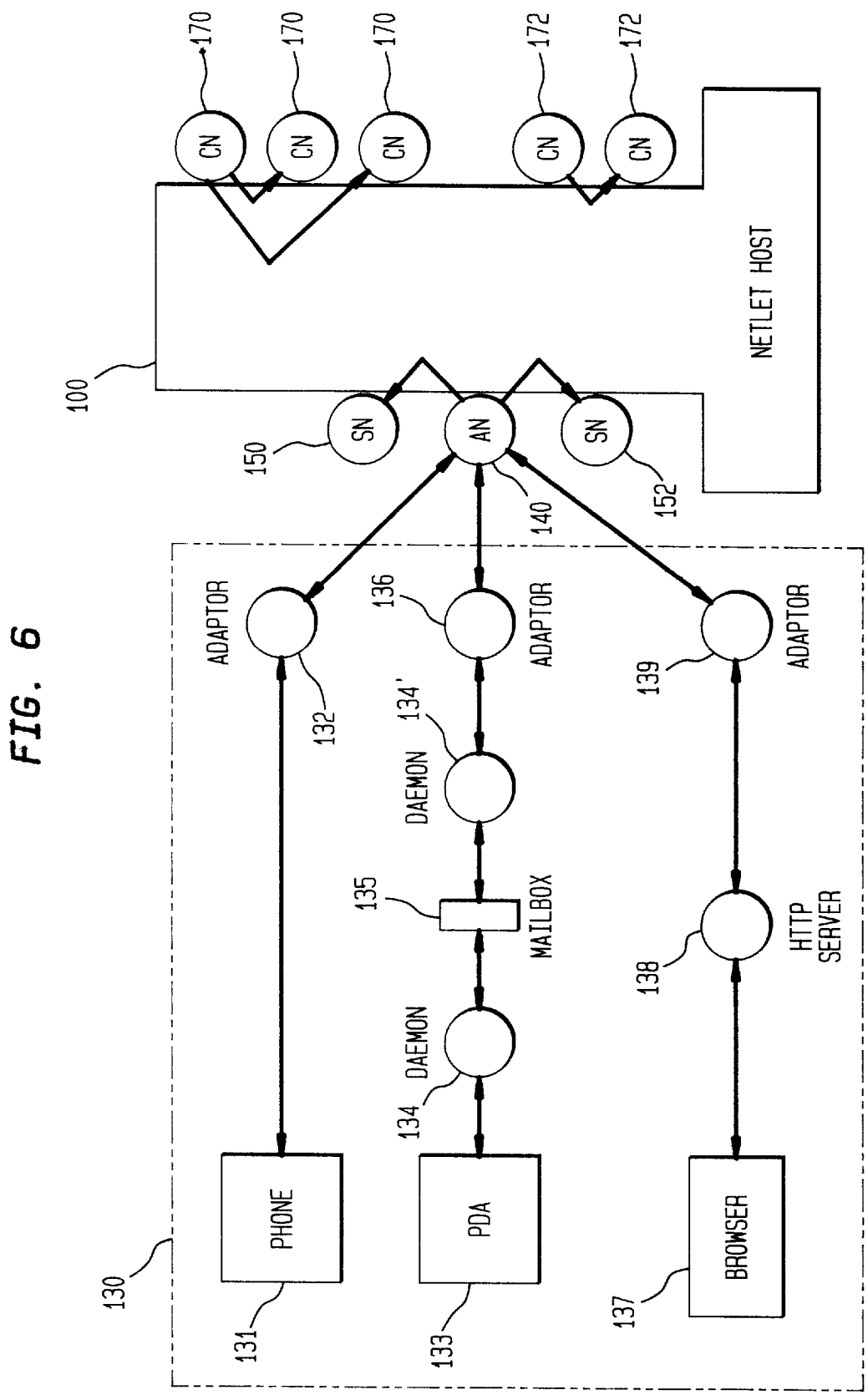
FIG. 6 is a block diagram of various user input devices according to an embodiment of the present invention.

FIG. 6 is a block diagram of various user input devices 130 according to an embodiment of the present invention. As described above, the agent netlet 140 interacts with the service netlets 150, 152 which dynamically integrate other component netlets 170, 172 to achieve the functionality requested by the user. A single agent netlet 140 can be assigned to a particular individual and act as that individual's representative in the network. As such, an agent netlet 140 can be designed to act as a personal assistant and to provide advice to the user. In this case, the agent netlet 140 would learn the individual's preferences and maintain a profile making it easier for the individual and the agent netlet to efficiently communicate. For example, an agent netlet 140 could learn how and when to notify a user based on the day of the week, the time of day and the importance of the information.

A variety of user access devices and transport options can be supported by using agent adaptors 132, 136, 139. A user could enter a request through a phone 131 and have a phone agent adaptor 132 translate the request for the agent netlet 140. The user could also enter a request on a Personal Digital Assistant (PDA) 133, such as a Palm Pilot available from Palm Computing, Inc., a subsidiary of 3Com Corporation. The PDA could send the request via E-mail through daemons 134 and a mailbox 135 to a PDA agent adaptor 136, allowing for the "disconnected" request and delivery of a software based service. An Internet browser 137 could also send a request through a Hypertext Transfer Protocol (HTTP) server to an Internet browser adaptor 139. HTTP is a set of rules for exchanging text, graphic images, sound, video, and other multimedia files on the World Wide Web.

Figure 7:
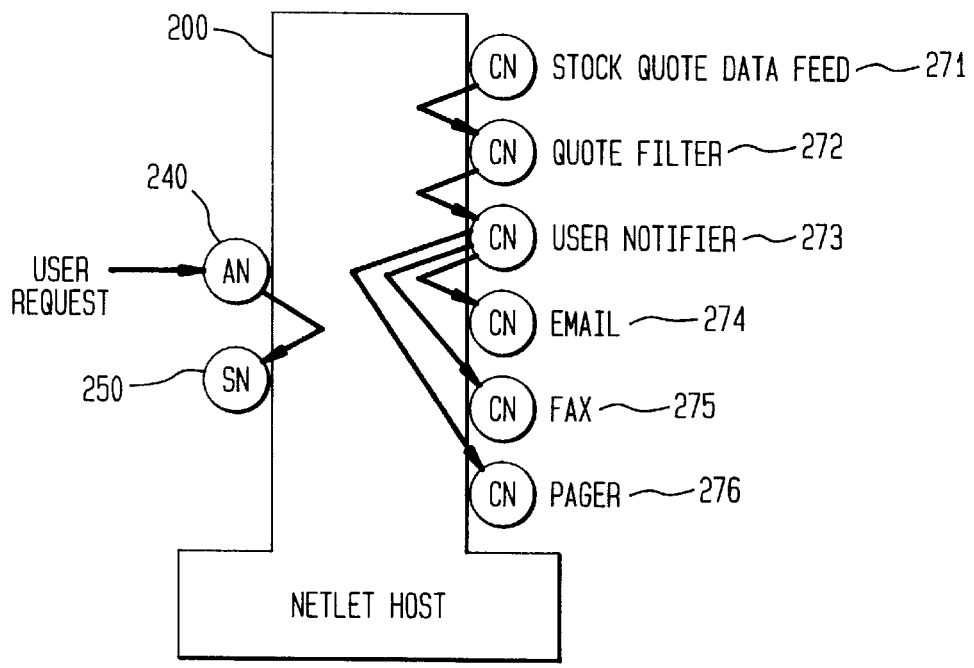
FIG. 7 is a block diagram of a dynamically composed stock quote notifying service executing on a host according to an embodiment of the present invention.

FIG. 7 is a block diagram of a dynamically composed stock quote notifying service executing on a netlet host 200 according to an embodiment of the present invention. A user can request, for example, that the agent netlet 240 dynamically create a service that informs the user when a particular stock reaches a certain price. The agent netlet 240 will select a service netlet 250 appropriate for that task. The service netlet 250 will then select and configure component netlets 271 through 276. The stock quote data feed netlet 271 can receive raw stock information over the Internet and send stock related information to the quote filter netlet 272. The quote filter netlet 272 can tell the user notifier netlet 273 if the stock has reached that price. The user notifier netlet 273 will then send an event to the E-mail netlet 274, the fax netlet 375 or the pager netlet 276 as appropriate. The user notifier netlet 273 can, of course, decide to notify the user by several of these methods.

Figure 8:
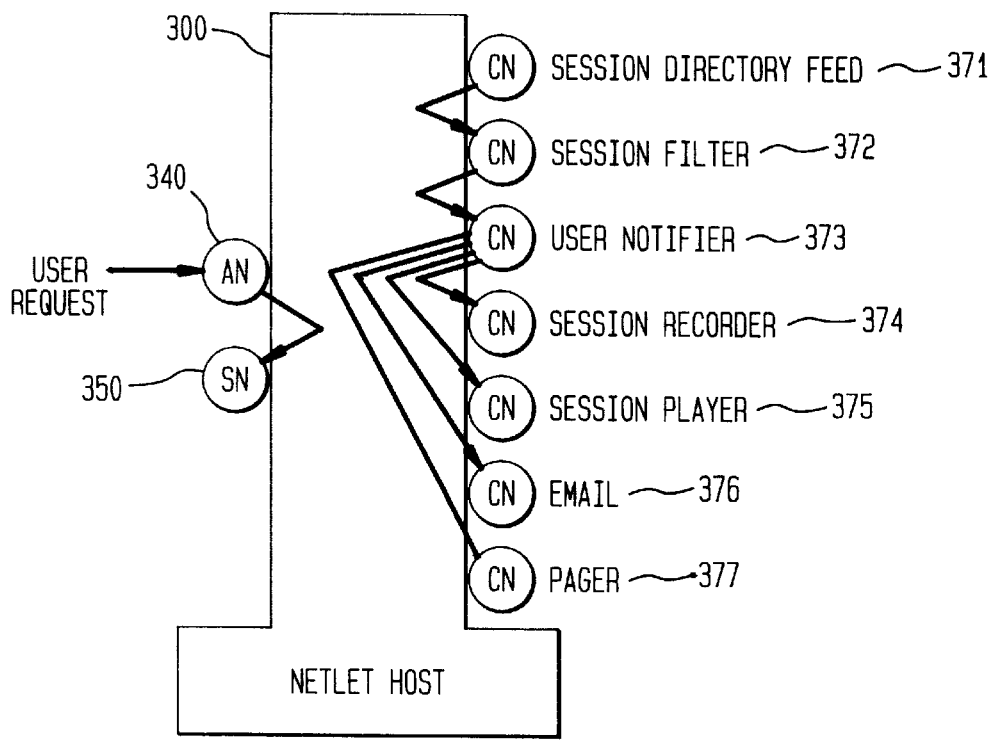
FIG. 8 is a dynamically composed multicast session recording and playback service executing on a host according to an embodiment of the present invention.

FIG. 8 is a dynamically composed multicast session recording and playback service executing on a host 300 according to an embodiment of the present invention. Multicast is an Internet Protocol (IP) based transport that broadcasts information, such as a video, to a set of receivers. The user can request that the agent netlet 340 create a software based service that pages the user if the Federal Reserve makes a multicast announcement. The user can also specify that the service automatically start multicast player tools on a personal computer to immediately play a Federal Reserve announcement, or to record the announcement and notify the user by E-mail. The agent netlet 340 will select a service netlet 350 appropriate for that task and the service netlet 350 will then select and configure component netlets 371 through 377. The session directory feed netlet 371 and the session filter netlet 372 can monitor announcements from the Federal Reserve. The user notifier netlet 373 can send one or more events to the session recorder netlet 374, the session player netlet 375, the E-mail netlet 376 and the pager netlet 377 as required. Note that the user notifier netlet 373, E-mail netlet 376 and pager netlet 377 can be the same netlets used in the stock quote notifying service shown in FIG. 7.

Figure 9:
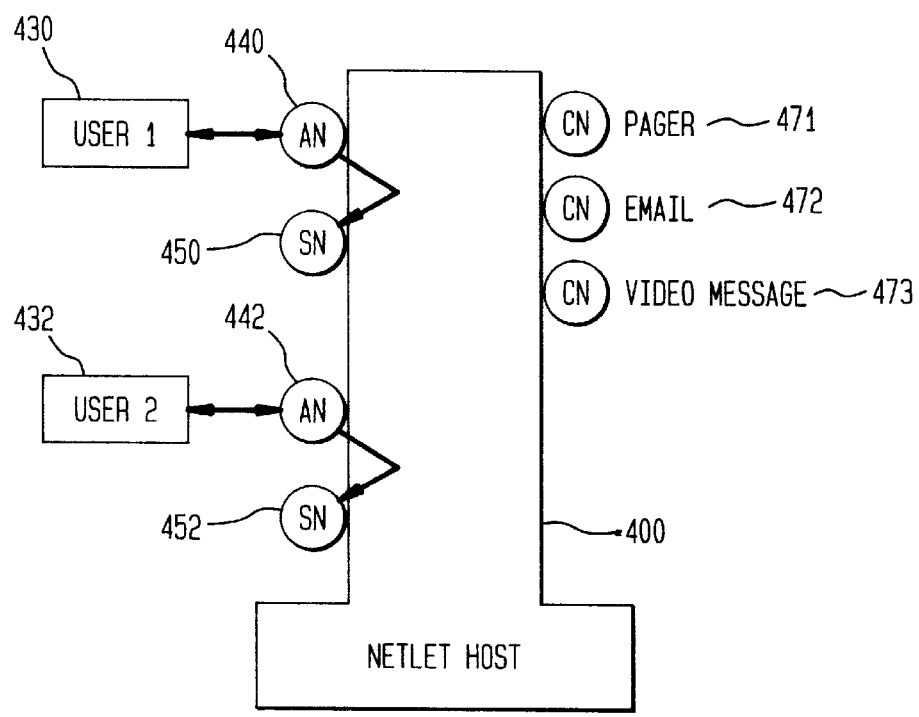
FIG. 9 is a dynamically composed run time call handling service executing on a host according to an embodiment of the present invention.

FIG. 9 is a dynamically composed run time call handling service executing on a netlet host 400 according to an embodiment of the present invention. A first user 430 can request that a first agent netlet 440 contact a second user 432. The first agent netlet 440 selects a service netlet 450 to create a call handling service from the pager netlet 471, the E-mail netlet 472 and the video message netlet 473. An agent netlet 442 associated with the second user 432 will also select a service netlet 452 to create a service that contacts the second user 432.

Figure 10:
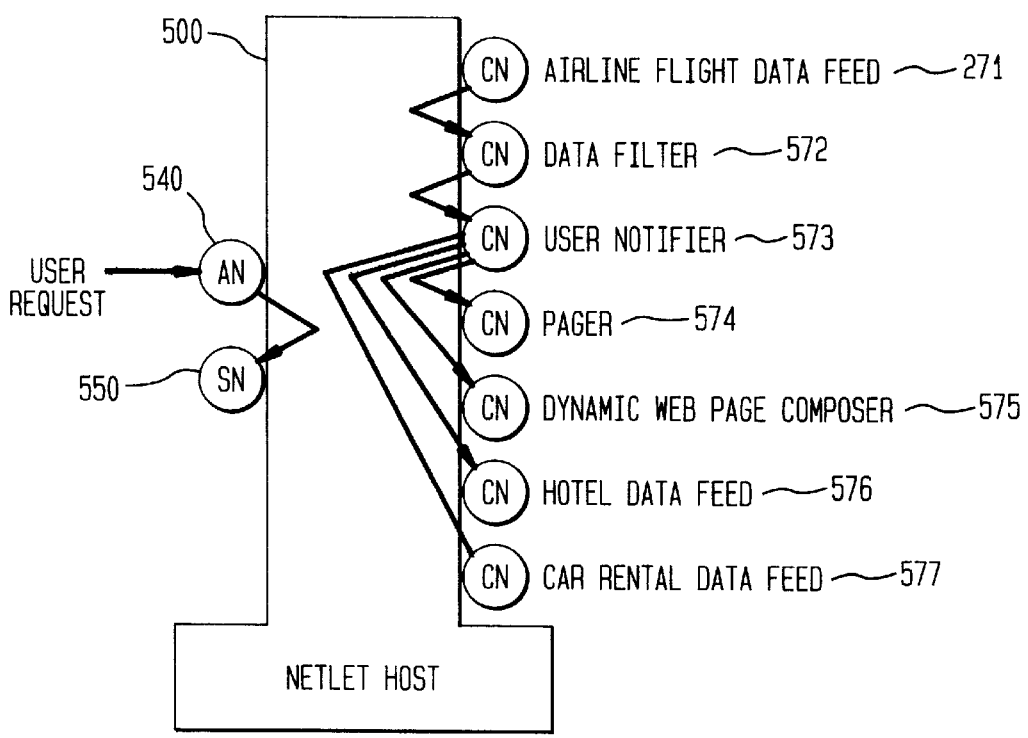
FIG. 10 is a dynamically composed travel coordinator service executing on a host according to an embodiment of the present invention.

FIG. 10 is a dynamically composed travel coordinator service executing on a netlet host 500 according to an embodiment of the present invention. A user can request, for example, that the agent netlet 540 dynamically create a service that informs the user when there are airline delays that affect the user's travel plans. The user can also ask that alternative travel plans be presented on a personal digital assistant and, if required, automatically extend car rental and hotel reservations by one day. The agent netlet 540 will select a service netlet 550 appropriate for these tasks and the service netlet 550 will select and configure component netlets 571 through 577. The airline flight data feed netlet 571 and the data filter netlet 572 can determine if there are any airline delays. The user notifier netlet 573, the pager netlet 574 and the dynamic web page composer netlet 575 can tell the user about a delay and the hotel data feed netlet 576 and the car rental data feed netlet 577 can change the user's reservations.

Although various embodiments are specifically illustrated and described herein, it will be appreciated that modifications and variations of the present invention are covered by the above teachings and within the purview of the appended claims without departing from the spirit and intended scope of the invention. For example, although dynamically composed stock quote, multicast session, call handling and travel coordinator services are shown and described, it can be appreciated that an endless number of services can be composed instead and still fall within the scope of the invention. Moreover, although Java is disclosed as one computer language that can be used in an embodiment of the present invention, another computer language that provides introspection, dynamic software loading and serialization could be used and still fall within the scope of the invention.

What is claimed is:

1. A method of dynamically composing a user-requested software based service, comprising:

responsive to an input from a user access device received through an agent adaptor, selecting an agent software component from a repository of software components;

the agent software component selecting a service software component from the repository of software components;

the service software component:

selecting a plurality of software components from the repository of software components, each of the selected software components providing a plurality of user-requested functions, and each component receiving an event causing that component to perform a user-requested function or generating an event as a result of that component performing a user-requested function; and configuring the selected software components for substantially immediate execution by identifying which components will send or receive events from which other components to create the user-requested software based service.

2. The method of claim 1, further comprising the step of:
executing the software based service.

3. The method of claim 1, wherein the software components are Java software components.

4. The method of claim 1, wherein the user access device is a computer.

5. The method of claim 1, wherein the user access device is a phone and the agent adaptor translates user input from the phone into an input for the agent software component.

6. The method of claim 1, wherein the user access device is a personal digital assistant and the agent adaptor translates user input from the personal digital assistant into an input for the agent software component.

7. The method of claim 1, wherein the user access device is an Internet browser and the agent adaptor translates user input from the Internet browser into an input for the agent software component.

8. The method of claim 1, wherein the selected, service and agent software components are executed on a software component host.

9. The method of claim 1, wherein the selected, service and agent software components are executed on a network having a plurality of software component hosts.

10. The method of claim 9, wherein the selected, service and agent software components can be executed on different software component hosts.

11. The method of claim 9, wherein each of the plurality of software component hosts includes a performance monitor in communication with at least one other of the plurality of software component hosts.

12. The method of claim 11, wherein the performance monitors communicate to balance the load of software executing on the plurality of software component hosts.

13. The method of claim 11, wherein the performance monitors communicate to determine the status of software components executing on the plurality of software component hosts.

14. An apparatus for dynamically composing a user-requested software based service, comprising:

responsive to an input from a user access device received through an agent adaptor, means for selecting an agent software component from a repository of software components;

the agent software component having means for selecting a service software component from the repository of software components;

the service software component having:

means for selecting a plurality of software components from the repository of software components, each of the selected software components providing a plurality of user-requested functions, and each component receiving an event causing that component to perform a user-requested function or generating an event as a result of that component performing a user-requested function; and means for configuring the selected software components for substantially immediate execution by identifying which components will send or receive events from which other components to create the user-requested software based service.

15. The apparatus of claim 14, further comprising:
executing means for executing the software based service.

16. The apparatus of claim 14, wherein the software components are Java software components.

17. The apparatus of claim 14, wherein the user access device is a computer.

18. The apparatus of claim 14, wherein the user access device is a phone and the agent adaptor translates user input from the phone into an input for the agent software component.

19. The apparatus of claim 14, wherein the user access device is a personal digital assistant and the agent adaptor translates user input from the personal digital assistant into an input for the agent software component.

20. The apparatus of claim 14, wherein the user access device is an Internet browser and the agent adaptor translates user input from the Internet browser into an input for the agent software component.

21. The apparatus of claim 14, wherein the selected, service and agent software components are executed on a software component host.

22. The apparatus of claim 14, wherein the selected, service and agent software components are executed on a network having a plurality of software component hosts.

23. The apparatus of claim 22, wherein the selected, service and agent software components can be executed on different software component hosts.

24. The apparatus of claim 22, wherein each of the plurality of software component hosts includes a performance monitor in communication with at least one other of the plurality of software component hosts.

25. The apparatus of claim 24, wherein the performance monitors communicate to balance the load of software executing on the plurality of software component hosts.

26. The apparatus of claim 24, wherein the performance monitors communicate to determine the status of software components executing on the plurality of software component hosts.

27. An apparatus for dynamically composing a user-requested software based service, comprising:

a storage unit to store a plurality of software components, each of the plurality of software components being capable of receiving an event causing that component to perform a user-requested function or generating an event as a result of that component performing a user-requested function;

a processing host to execute an agent software component selected from the storage unit in response to an input selection signal, the processing host to execute a service software component selected from the storage unit by the agent software component, the processing host to select from said storage unit a plurality of software components selected by the service software component, each software component providing a plurality of user-requested functions, the processing host to configure the selected software components for substantially immediate execution by defining which components will send or receive events from which other components to create the user-requested software based service;

a user access device to generate the input selection signal; and an agent adaptor coupling the user access device to the processing host.

28. The apparatus of claim 27, wherein said processing host also executes the software based service by executing the selected software components.

29. The apparatus of claim 27, wherein the software components are Java software components.

30. The apparatus of claim 27, wherein said user access device is a computer.

31. The apparatus of claim 27, wherein said user access device is a phone and said agent adaptor translates user input from said phone into an input for the agent software component.

32. The apparatus of claim 27, wherein said user access device is a personal digital assistant and said agent adaptor translates user input from said personal digital assistant into an input for the agent software component.

33. The apparatus of claim 27, wherein said user access device is an Internet browser and said agent adaptor translates user input from said Internet browser into an input for the agent software component.

34. The apparatus of claim 27, wherein the selected, service and agent software components are all executed on a single processing host.

35. The apparatus of claim 27, wherein the selected, service and agent software components are executed on a network having a plurality of processing hosts.

36. The apparatus of claim 35, wherein the selected, service and agent software components can be executed on different processing hosts.

37. The apparatus of claim 35, wherein each of the processing hosts includes a performance monitor in communication with at least one other of said plurality of processing hosts.

38. The apparatus of claim 37, wherein the performance monitors communicate to balance the load of software executing on said plurality of processing hosts.

39. The apparatus of claim 37, wherein the performance monitors communicate to determine the status of software components executing on said plurality of processing hosts.

* * * * *